US010402048B1

(12) United States Patent
Carman

(10) Patent No.: US 10,402,048 B1
(45) Date of Patent: Sep. 3, 2019

(54) SYSTEM AND METHOD FOR PREVENTING UNDESIRABLE COMMUNICATIONS FROM SMART DEVICES

(71) Applicant: Eric Carman, Las Vegas, NV (US)

(72) Inventor: Eric Carman, Las Vegas, NV (US)

(73) Assignee: Colossus Mobile Applications LLC, Las Vegas, NV (US)

( * ) Notice: Subject to any disclaimer, the term of this patent is extended or adjusted under 35 U.S.C. 154(b) by 278 days.

(21) Appl. No.: 14/878,124

(22) Filed: Oct. 8, 2015

(51) Int. Cl.
| | |
|---|---|
| *G06F 3/0482* | (2013.01) |
| *H04L 29/06* | (2006.01) |
| *H04L 29/08* | (2006.01) |
| *H04L 12/58* | (2006.01) |

(52) U.S. Cl.
CPC ............ *G06F 3/0482* (2013.01); *H04L 51/12* (2013.01); *H04L 65/403* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,041,344 B1 | 10/2011 | Coughlan et al. | |
| 8,255,987 B2 * | 8/2012 | Bono | H04L 51/12 726/14 |
| 2004/0198061 A1 | 10/2004 | Jost et al. | |
| 2009/0041222 A1 * | 2/2009 | Guven | H04M 1/663 379/210.02 |
| 2010/0254525 A1 | 10/2010 | Maly et al. | |
| 2010/0255820 A1 * | 10/2010 | Maly | H04M 1/271 455/414.1 |
| 2010/0333129 A1 * | 12/2010 | Alhadeff | G06Q 30/02 725/27 |
| 2013/0203397 A1 * | 8/2013 | Vidal | H04W 12/06 455/418 |

(Continued)

FOREIGN PATENT DOCUMENTS

| | | |
|---|---|---|
| WO | WO2010094626 A1 | 8/2010 |
| WO | WO2012135869 A2 | 10/2012 |

OTHER PUBLICATIONS

Trotman, Andrew, "New App Stops You Drunk Calling Your Ex," The Telegraph, Nov. 25, 2014, http://www.telegraph.co.uk/finance/newsbysector/mediatechnologyandtelecoms/digital-media/11254559/A-condom-for-your-phone-New-app-stops-you-drunk-calling-your-ex.html.*

(Continued)

*Primary Examiner* — Christopher J Fibbi
(74) *Attorney, Agent, or Firm* — FisherBroyles, LLP; Rob L. Phillips

(57) ABSTRACT

System and method for preventing undesirable smart device communications. A system includes memory for storing a list of contacts, the memory integrated into a smart device; and a locking application configured to permit a user to select and lock one or more contacts included within said list of contacts such that the user is unable to communicate with the selected one or more contacts via said smart device. The locking application may be further configured to permit a user to select a pre-established time period during which the one or more selected contacts remain locked. Challenges may be presented to the user to unlock the contacts in advance of the lockout time expiring. Optional features include GPS tracking, rewards, ride and networking modules.

9 Claims, 18 Drawing Sheets

(56) References Cited

U.S. PATENT DOCUMENTS

2016/0197866 A1* 7/2016 Cha .................... H04L 51/12
                                                        709/205
2016/0260274 A1* 9/2016 Kuenzi .............. G07C 9/00309

OTHER PUBLICATIONS

Drunk Lock—iPhone App on Behance, https://www.behance.net/gallery/11200425/Drunk-Lock-iPhone-App, (3 pages).
Woollaston, Victoria, Never Drunk Dial Again! App Only Lets You Make Calls If You Can Solve Its Brainteasers, DailyMail.com, Mar. 24, 2015, http://www.dailymail.co.uk/sciencetech/article-3009186/Never-drunk-dial-App-lets-make-calls-solve-brainteasers-better-good-maths.html, (23 pages).
Drunk Lock—Android Apps on Google Play, https://play.google.com/store/apps/details?id=com.duesmobile.drunklock&hl=en, (3 pages).
Halleck, Thomas, Stop Drunk Dialing: Drunk Mode Is the App for That (and Texting, and Snapchatting Too), IB Times, Nov. 25, 2014, http://www.ibtimes.com/stop-drunk-dialing-drunk-mode-app-texting-snapchatting-too-1728928, (7 pages).
APPCRAWLR (The App Discovery Engine), 10 Best Apps for Drunk Dial (iPhone_iPad), http://appcrawlr.com/ios-apps/best-apps-drunk-dial, (6 pages).

* cited by examiner

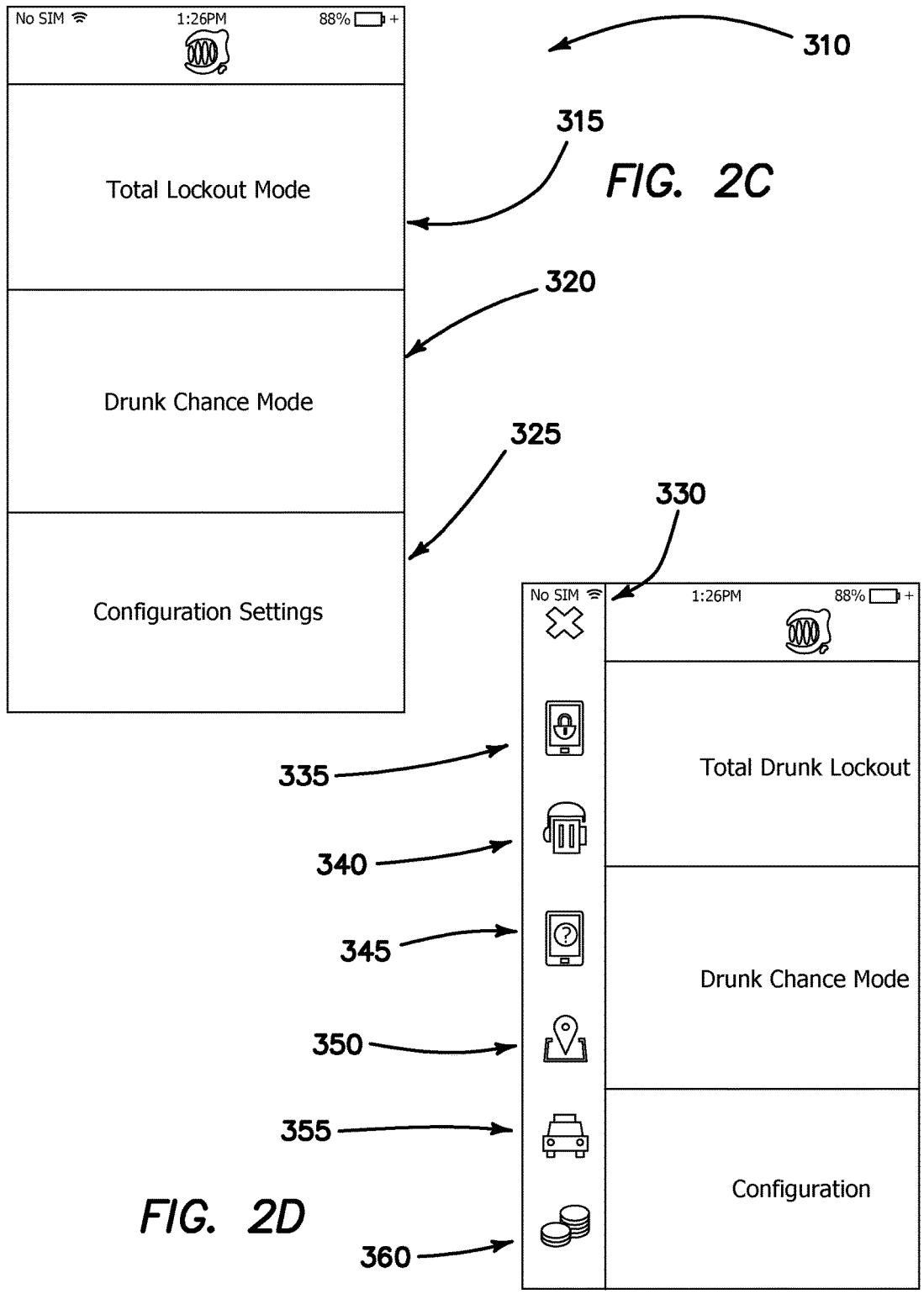

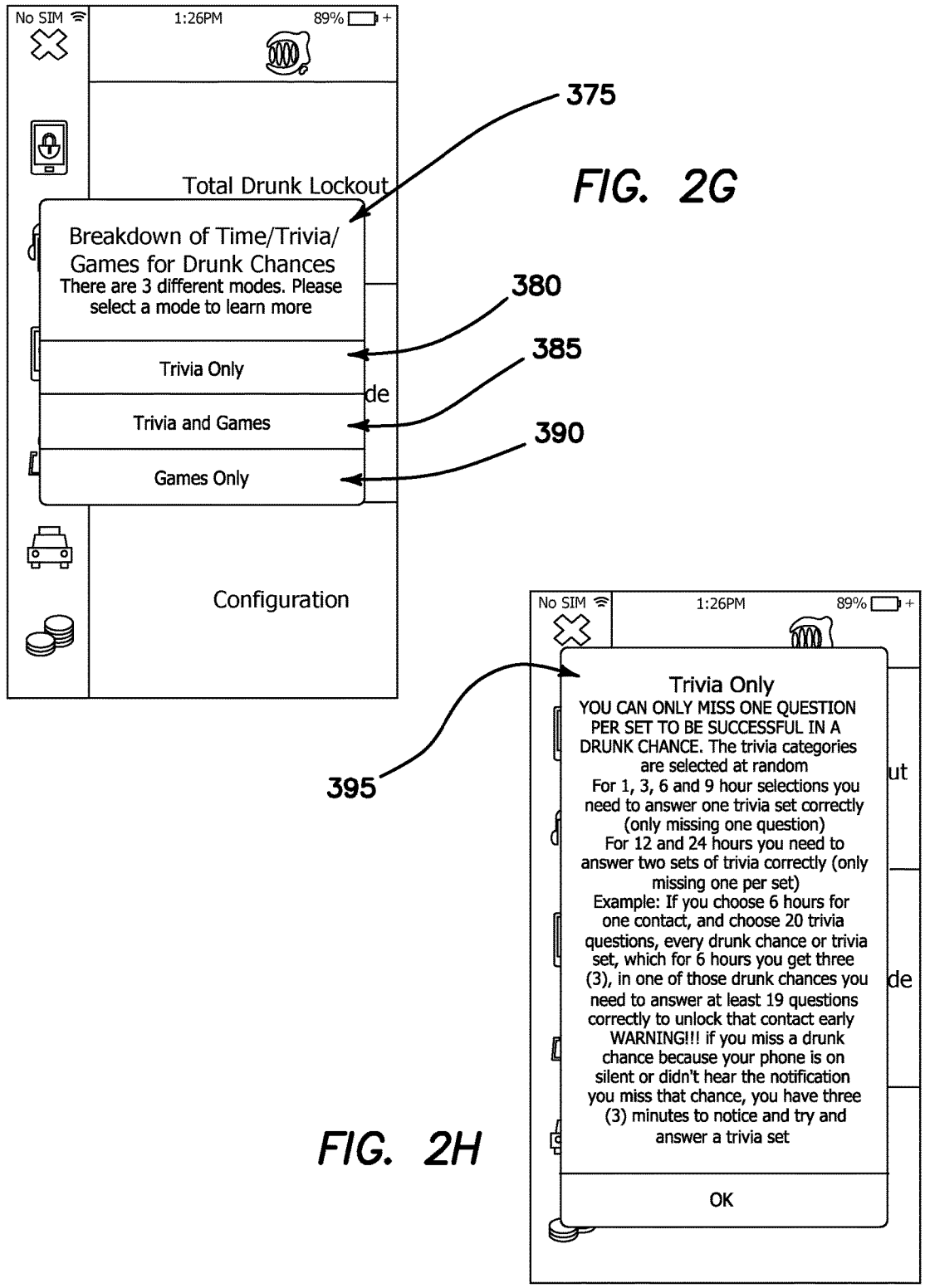

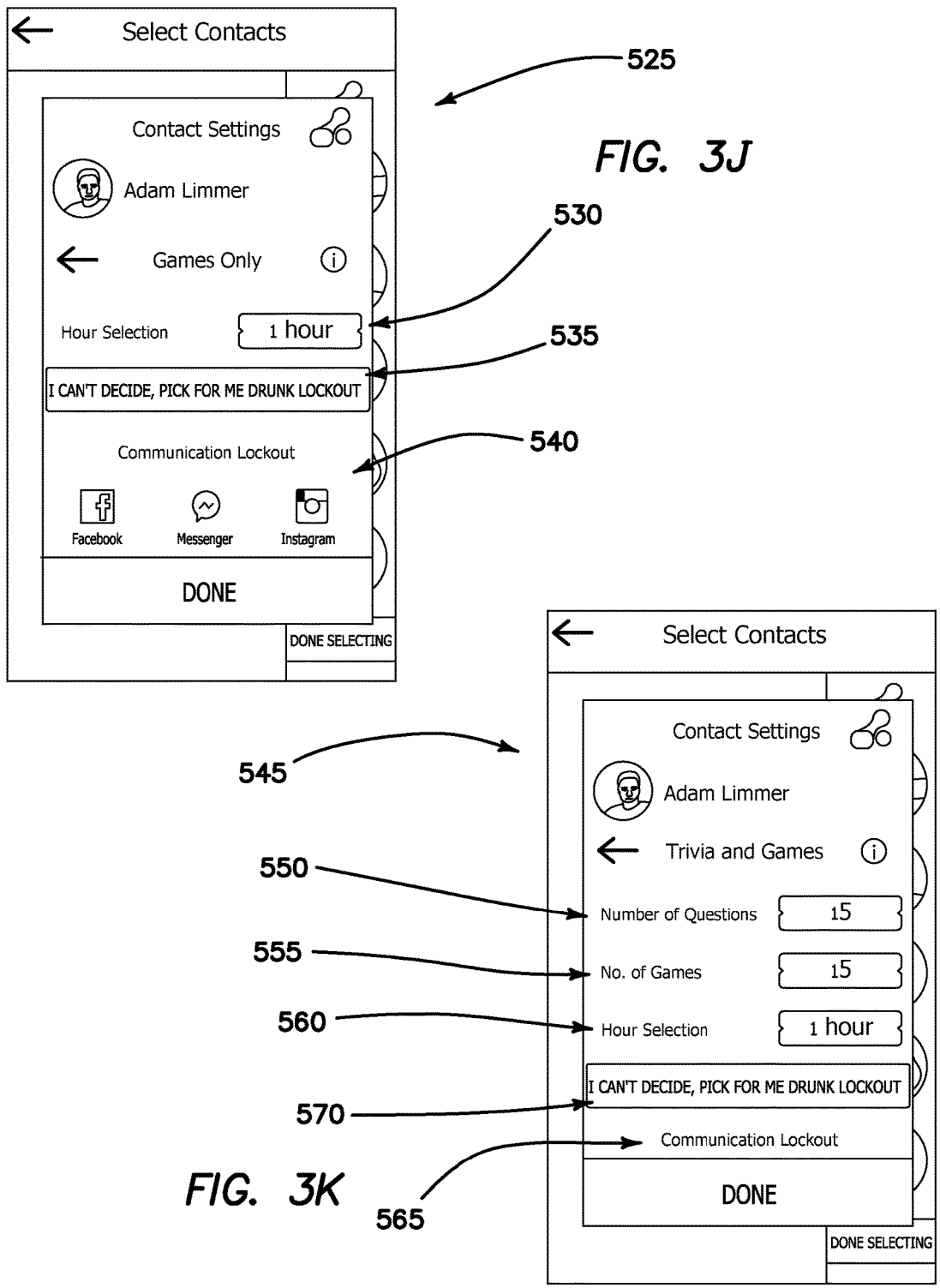

SYSTEM AND METHOD FOR PREVENTING UNDESIRABLE COMMUNICATIONS FROM SMART DEVICES

FIELD OF THE INVENTION

The embodiments of the present invention relate to a system and method for preventing a user from making undesirable smart device communications.

BACKGROUND

Smart devices have made text communications, calls and social communications routine from anywhere and anytime. Unfortunately, in some instances, users are in no condition to send text messages and/or make calls. For example, inebriated users having lost their inhibitions tend to send text messages and/or make calls or post messages that can be offensive, misplaced and otherwise undesirable for the user and recipient.

It would be advantageous to develop a system and method for preventing a user from making undesirable smart device communications. In addition, the system and method should provide a mechanism for the user to evade or overcome the prevention tool.

SUMMARY

One embodiment of the present invention is directed to a system comprising: memory for storing a list of contacts, said memory integrated into a smart device; and a locking application configured to permit a user to select and lock one or more contacts included within said list of contacts such that said user is unable to communicate with said selected one or more contacts via said smart device. In one embodiment, the locking application is further configured to permit a user to select a pre-established time period during which the one or more selected contacts remain locked.

Another embodiment of the present invention is a system comprising: memory for storing a list of contacts, said memory integrated into a smart device; a locking application configured to permit a user to select and lock one or more contacts included within said list of contacts such that said user is unable to communicate with said selected one or more contacts via said smart device; and a challenge module configured to present one or more challenges to said user wherein accomplishing said one or more challenges unlocks the one or more locked contacts. In one embodiment, the challenges may be based on trivia and/or games.

A method according to the embodiments of the present invention comprises: providing a locking application for download to memory of a smart device, wherein said locking application is configured to permit a user to select and lock one or more contacts within a list of contacts stored in memory of said smart device such that said user is unable to communicate with said selected one or more contacts via said smart device. Challenges may be presented to unlock the contacts during the lockout time period.

Other embodiments of the system and method include: (i) a tracking module so that users are able to keep track of others in their group or party; (ii) a ride module allowing users to secure a ride; (iii) rewards module allowing users to earn points redeemable for services and goods; and (iv) networking module allowing users to network with others in proximity thereto.

Other variations, embodiments and features of the present invention will become evident from the following detailed description, drawings and claims.

BRIEF DESCRIPTION OF THE DRAWINGS

FIGS. 2A-2M illustrate exemplary screen shots according to the embodiments of the present invention;

DETAILED DESCRIPTION

Figure 1:
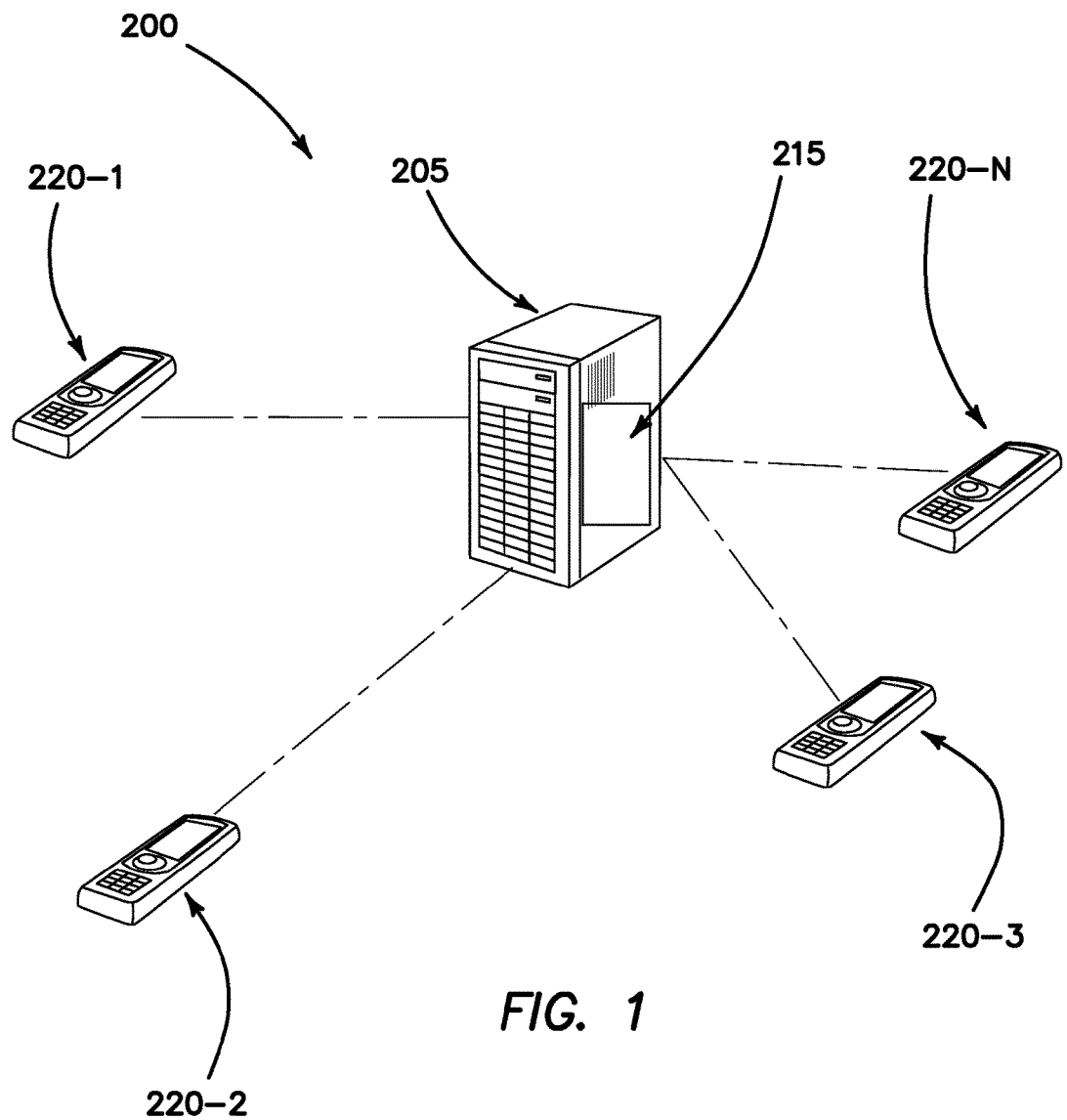
FIG. 1 illustrates a block diagram of a network for facilitating the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a computer should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention relate to preventing undesirable text messages, instant messages, social media messages and calls from smart devices. Undesirable text messages, instant messages, social media messages and calls tend to occur when users are inebriated on alcohol and/or drugs. The embodiments of the present invention are facilitated by a software-based application (aka "App") downloadable to a smart device.

FIG. 1 shows a block diagram of a wireless/wired network system 200 which may be used to facilitate the embodiments of the present invention. The network system 200 comprises a server 205, including one or more processors maintaining a software-based, locking application 215 and remote smart devices 220-1 through 220-N (e.g., smart phones) configured to access said server 205 and download the locking application 215.

Smart devices include memory for storing all types of data including software-based applications, internet browsers, maps, calendars, music, contacts, etc. The embodiments of the present invention may be used with any and all smart device types (e.g., phone, tablets, etc.) and operating systems (e.g., iOS, Android, etc.).

Figure 2A:
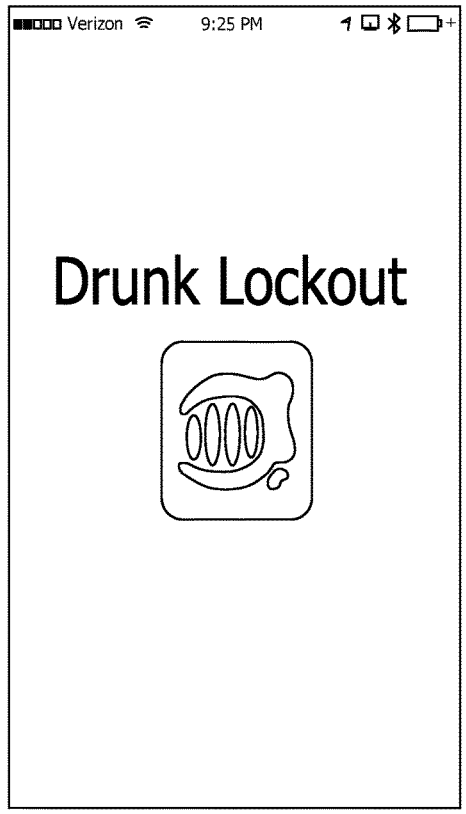
Figure 2B:
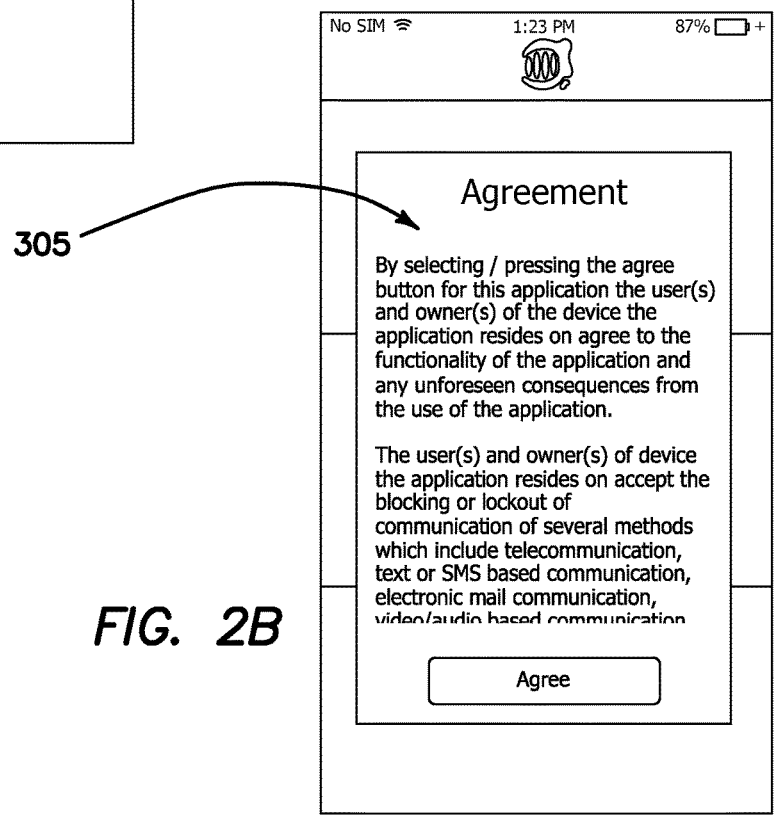

FIG. 2A shows an access icon 300 which may be depicted on a smart device display after the software-based, locking application 215 is downloaded to the smart device 220-1 through 220-N. As shown, the software-based, locking application 215 may be given a fanciful name such as "Drunk Lockout" or any other suitable name. FIG. 2B shows pop-up disclaimer agreement terms 305 which the user must agree to prior to utilizing the locking application 215. FIG. 2C shows the main menu screen 310. The main menu screen 310 provides access to a total lockout mode 315, drunk chance mode 320 and configuration settings 325.

As shown in FIG. 2D, selecting the configuration settings 325 causes a side menu 330 to appear. The side menu 330 includes a series of access icons comprising: (i) a total lockdown mode explanation icon 335; (ii) a drunk chance mode explanation icon 340; (iii) modes of trivia and games for drunk chances icon 345; (iv) drunk lockout GPS tracking icon 350; (v) taxi setup icon 355; and (vi) rewards icon 360.

Figure 2E:
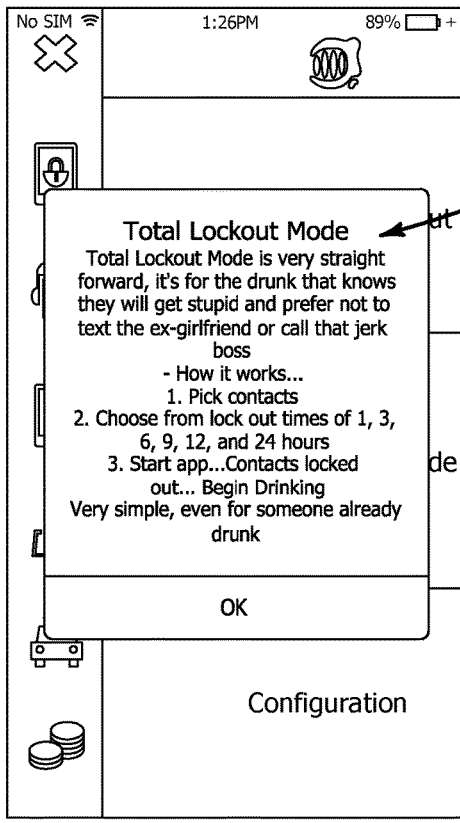
Figure 2F:
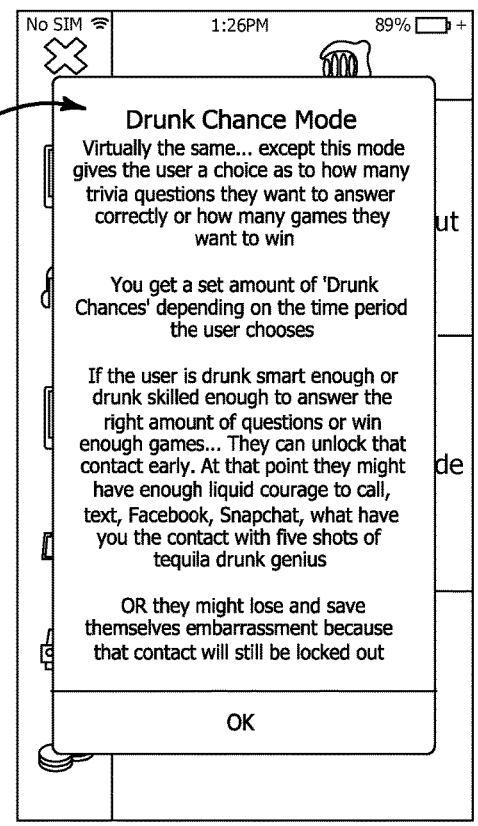

FIG. 2E shows a total lockdown mode explanation 365 comprising the steps of (i) picking contacts; (ii) choosing a lock out time; and (iii) starting the locking application 215 to lock selected contacts. FIG. 2F shows a drunk chance mode explanation 370 comprising skill-based challenges which, if accomplished properly, unlock the contact or contacts and if not accomplished properly, do not unlock the contact or contacts. This feature is designed to prevent a very inebriated user from unlocking and accessing contacts to make undesirable communications with the smart device while permitting a less inebriated user to unlock and access the contacts to make desired communications. While the challenges described herein are based on trivia and games, those skilled in the art will recognize that other challenges including those based on coordination, dexterity, hand/eye coordination and the like may also be used.

Figure 2I:
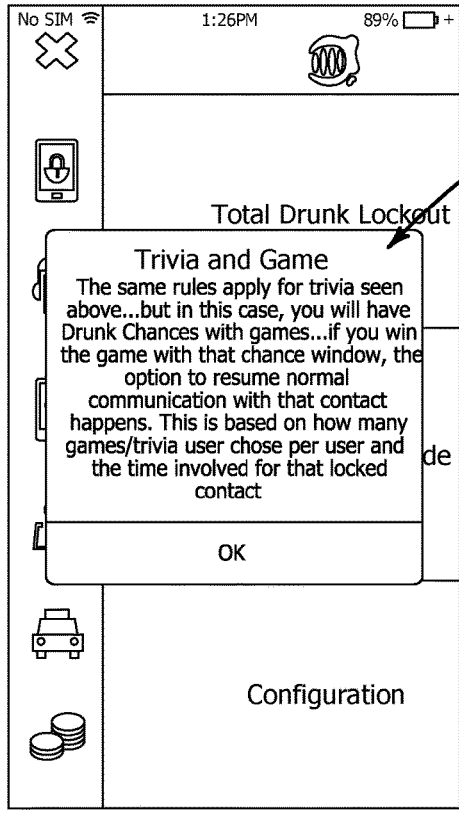
Figure 2J:
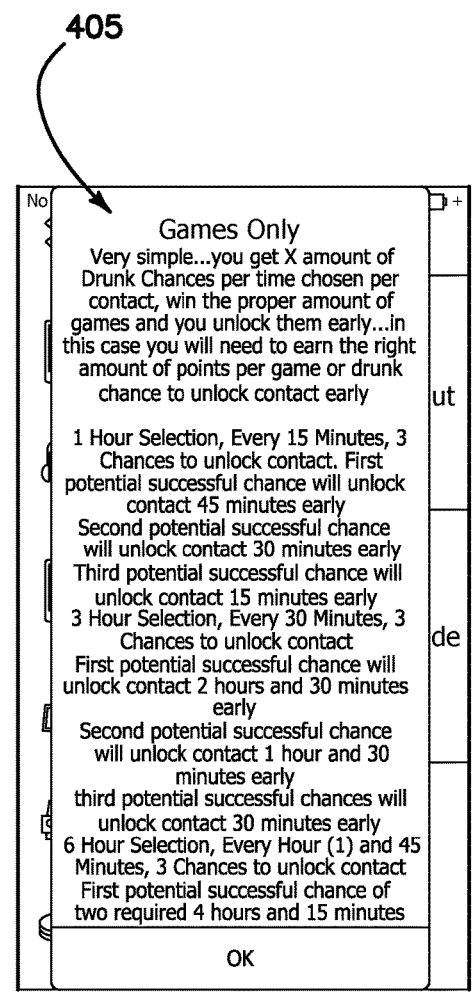

FIG. 2G shows modes of trivia and games for drunk chances 375. As shown, three modes are available comprising trivia mode 380, trivia and games mode 385 and games mode 390. The selection of each mode 380, 385 and 390 advances the user to a corresponding explanation window 395, 400 and 405 as shown in FIG. 2H-2J. The trivia mode 380 allows a user to answer a series of trivia questions. To unlock the contact or contacts, the user must answer a pre-selected number of trivia questions correctly. In one embodiment, to unlock the contact or contacts based on a time lock selection less than 9 hours, a user must answer 19 of 20 questions from a trivia set formed of random trivia questions. If the time lock selection is more than nine hours (e.g., 12 of 24 hours), the user must answer two sets of twenty trivia questions with the same accuracy percentage. The time selections and required accuracy may be set by the user and/or pre-set as part of the locking application. As set forth in the more detail below, the trivia questions may be intermittently presented to the user's smart device. The trivia questions may be stored locally on smart device memory and/or may be transmitted to the smart device from a remote location.

The trivia and games mode 385 and games mode 390 operate in much the same manner as the trivia mode 380 but with games being included or exclusively presented. In one embodiment, missing a trivia question or game is deemed an incorrect answer or failed game challenge. Each contact may be locked using a different time selection and mode.

Table 1 lists exemplary time selections and required actions to unlock the contact or contacts. Those skilled in the art will recognize that there are countless combinations of time selections and required actions without departing from the spirit and scope of the present invention. As shown in Table 1, the user may have several opportunities during the lock time to unlock the smart device.

TABLE 1

| Time Selection | Trivia and/or Games Presented Every: | Possible Outcome |
|---|---|---|
| 1 Hour | 15 Minutes | Smart Device Unlocked up to 15, 30 or 45 Minutes Early |
| 3 Hours | 30 Minutes | Smart Device Unlocked up to 2.5 Hours, 2 Hours, 1.5 Hours, 1 Hour or 30 Minutes Early |
| 6 Hours | 1 Hour and 45 Minutes | Smart Device Unlocked up to 4 Hours and 15 Minutes, 2 Hours and 30 Minutes or 45 Minutes Early |
| 9 Hours | 2 Hours | Smart Device Unlocked up to 7, 5 or 3 Hours Early |
| 12 Hours | 1 Hour and 45 Minutes | Smart Device Unlocked up to 10 Hours and 45 Minutes, 8 Hours and 30 Minutes, 6 Hours and 45 Minutes, 5 Hours, 3 Hours and 15 Minutes or 1 Hour and 30 Minutes Early |
| 24 Hours | Non-Uniform | Smart Device Unlocked up to 21 Hours and 30 Minutes, 18 Hours, 14 Hours and 30 Minutes, 11 Hours, 7 Hours and 30 Minutes or 4 Hours Early |

Figure 2K:
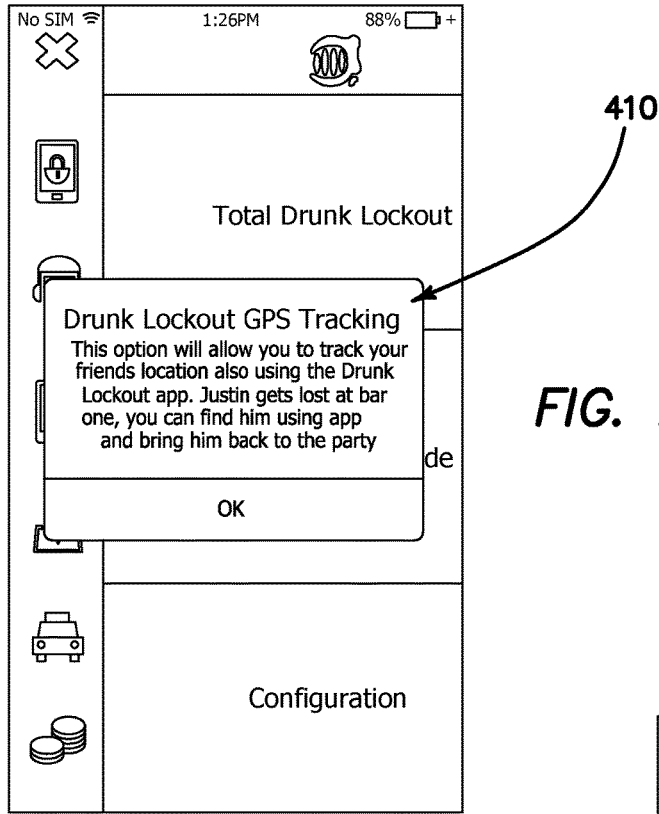
Figure 2L:
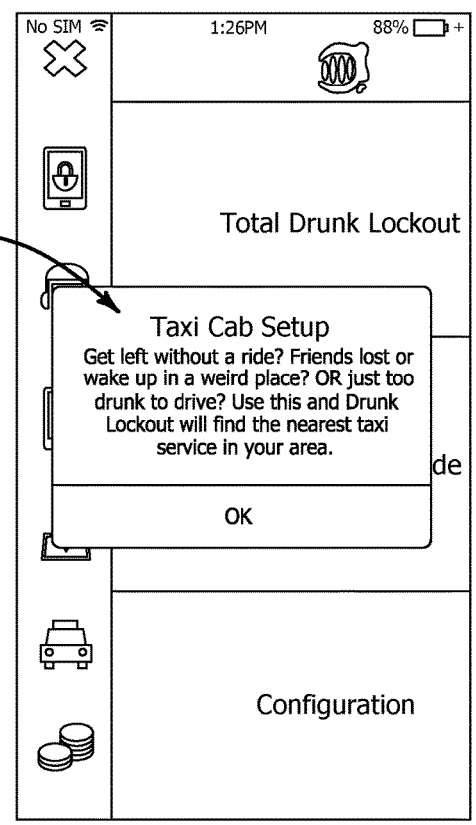
Figure 2M:
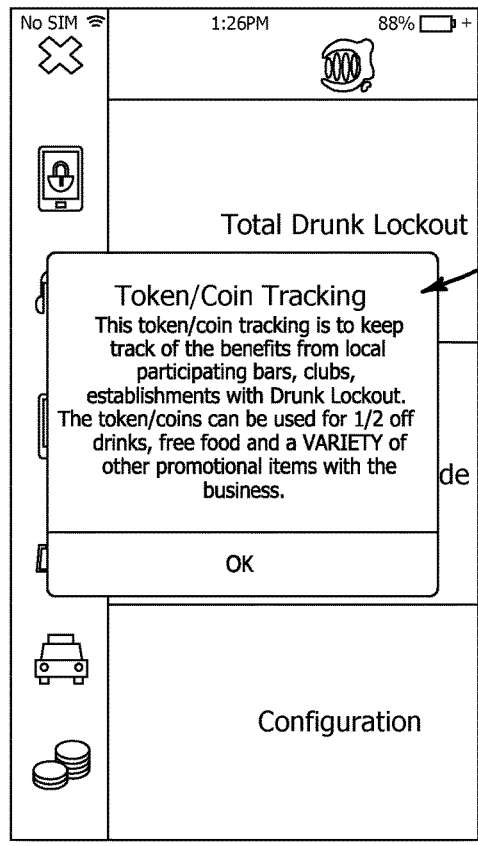

FIG. 2K shows a drunk lockout GPS tracking explanation 410. This feature allows users to track friends or contacts also using the locking application 215. FIG. 2L shows a taxi setup explanation 415. This feature facilitates a ride via taxi, ride-sharing service and the like for the inebriated user (or sober user). FIG. 2M shows a rewards explanation 420. This feature allows users to earn and redeem points for discounts on products and/or services.

Figure 3A:
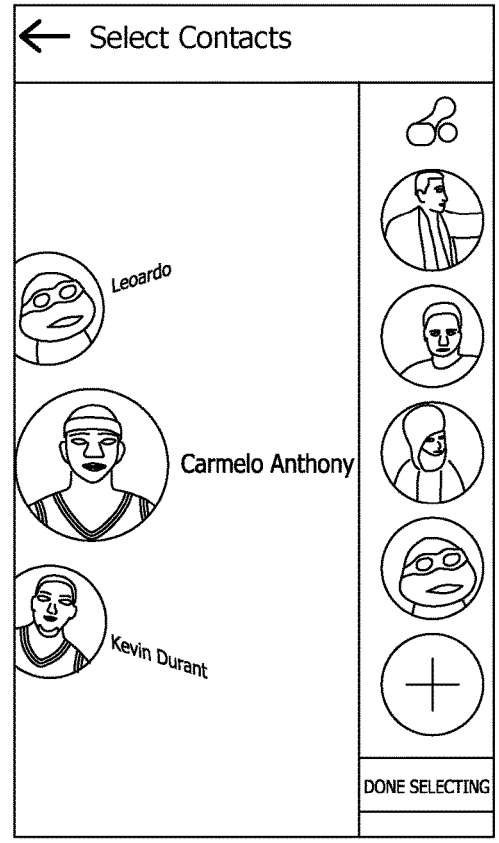
FIGS. 3A-3Q illustrate exemplary screen shots detailing a methodology of utilizing the locking application according to the embodiments of the present invention.
Figure 3B:
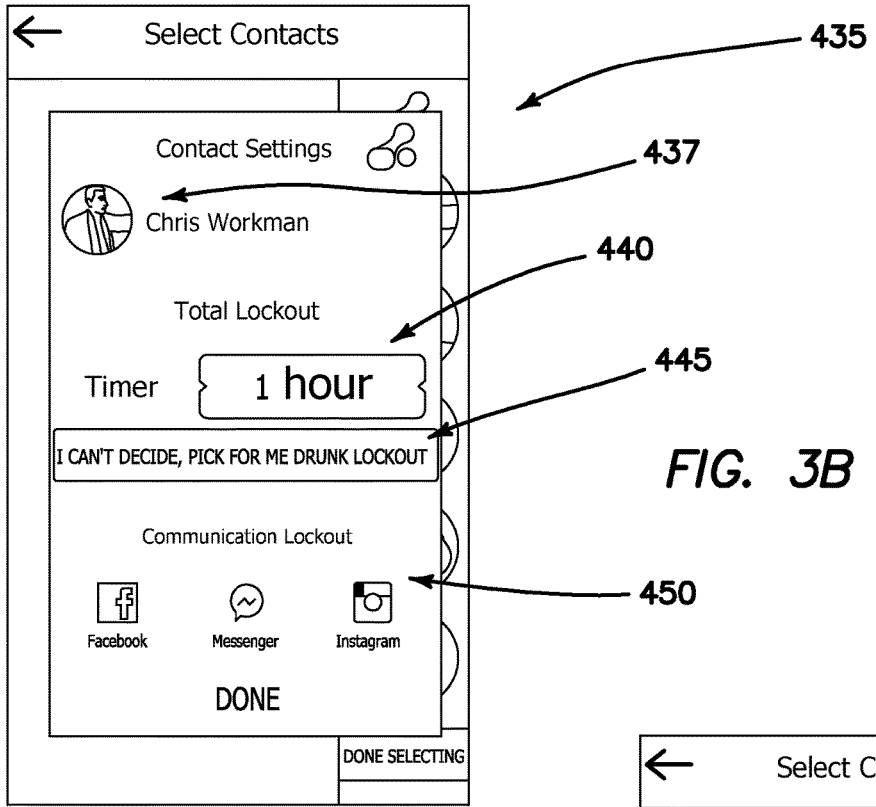

FIGS. 3A-3M show exemplary screen shots detailing a methodology of utilizing the locking application according to the embodiments of the present invention. FIG. 3A shows a contact lockout screen 430. The contact lockout screen 430 is accessed by selecting total lockout mode or drunk chance mode from the main menu screen. From the contact lockout screen 430, the user is able to select the contacts to lockout. FIG. 3B shows a total lockout mode screen 435. The user is able to select a lockout time for the contact 437 using a flip dial 440. In one embodiment, the lockout times include 1, 3, 6, 9, 12 and 24 hours but any time periods are possible. The user may also select a random lockout time using the "I Can't Decide, Pick for Me Drunk Lockout" icon 445. The user may also select which communication methods 450 to shut down. That is, certain communication methods 450 may be left unaffected while others are locked. Pressing the "Start Lockout, Begin Drinking!" icon 452, shown in FIG. 3C, stores the selected parameters and locks the contacts. FIG. 3D shows a total lockout alert 454 which the user must approve to formally begin the locking application 215.

Once the total lockout alert 454 is approved, the user is advanced to a drunk lockout contacts screen 455, shown in FIG. 3E, detailing the selected contacts 460 and lockout time remaining 465 for each. In addition, once the contacts are locked, pressing the drunk lockout application 215 advances the user to the drunk lockout contacts screen 455 for updates on lockout time remaining 465 for each contact 460.

Figure 3C:
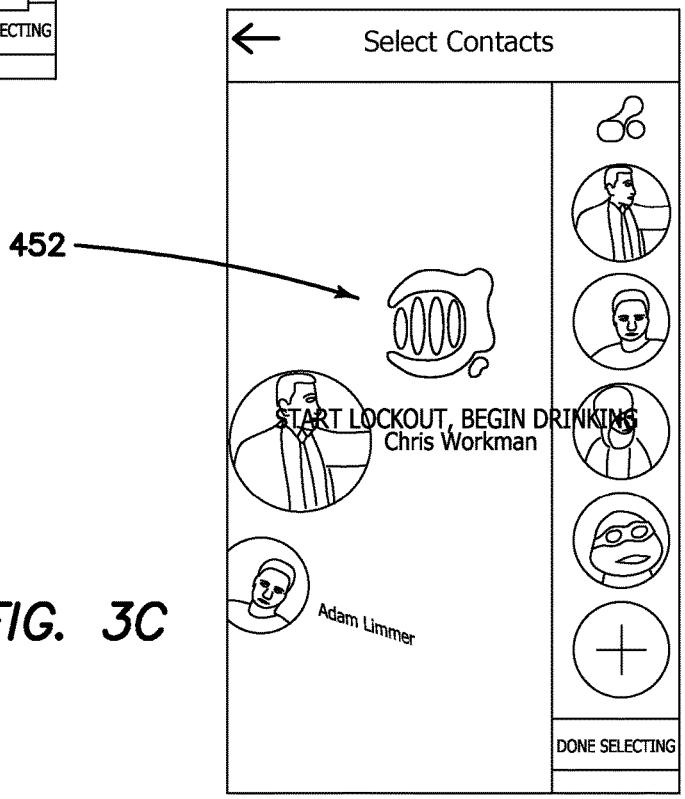
Figures 3D, 3E:
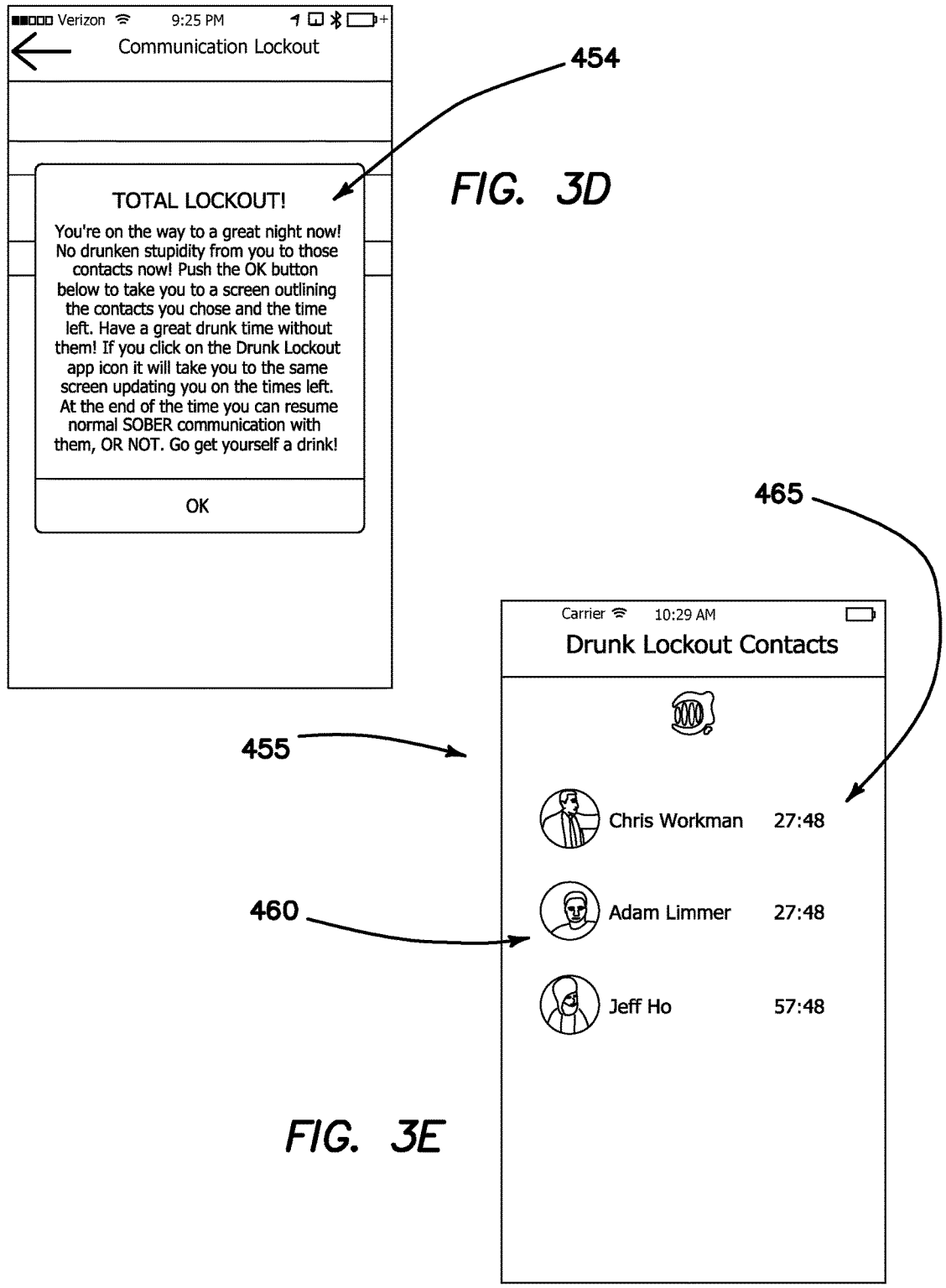
Figure 3F:
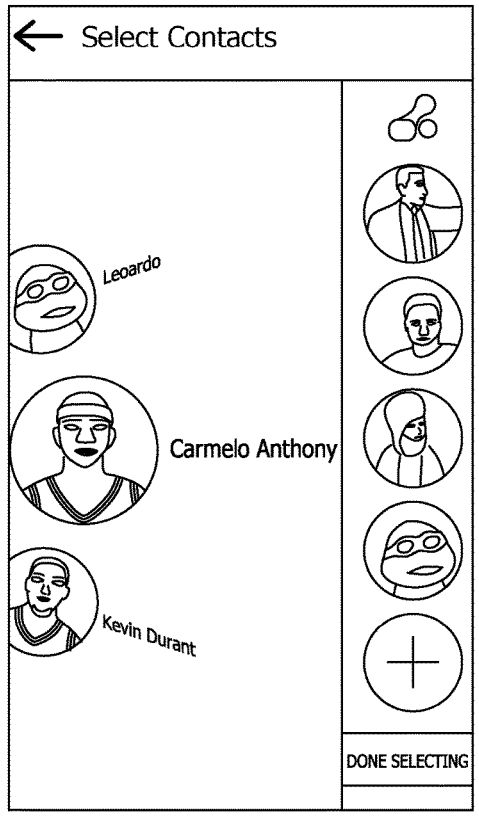
Figure 3G:
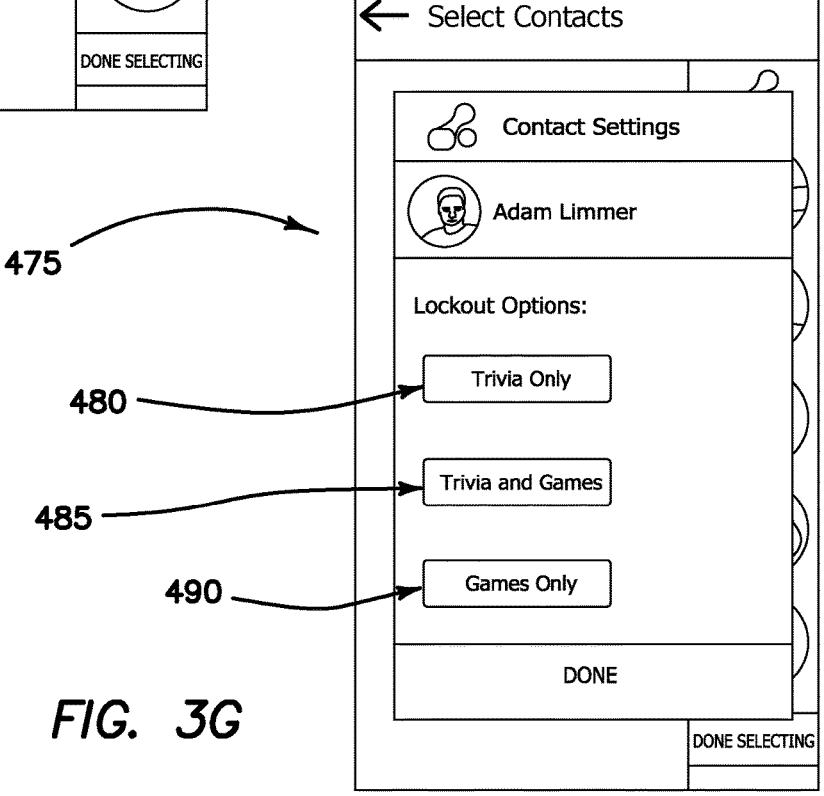

FIG. 3F shows a contact lockout screen 470. The contact lockout screen 470 is accessed by selecting drunk chance mode from the main menu screen. From the contact lockout screen 470, the user is able to select the contacts to lock out. FIG. 3G shows a drunk chance lockout screen 475. The user is able to select the type of lockout challenge from trivia only 480, trivia and games 485 and games 490.

Figure 3H:
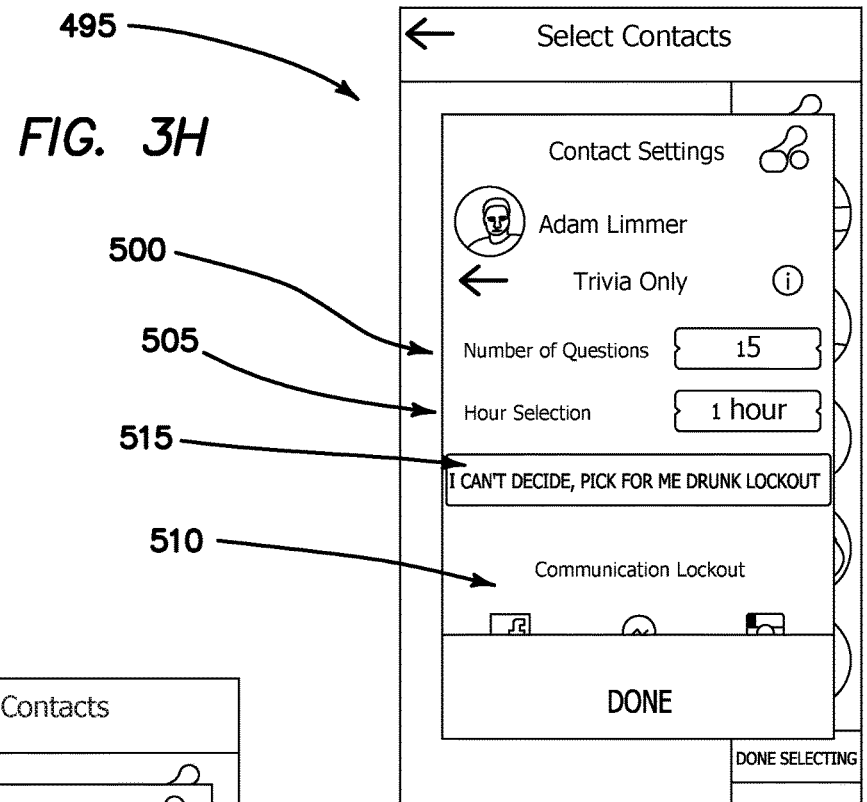
Figure 3I:
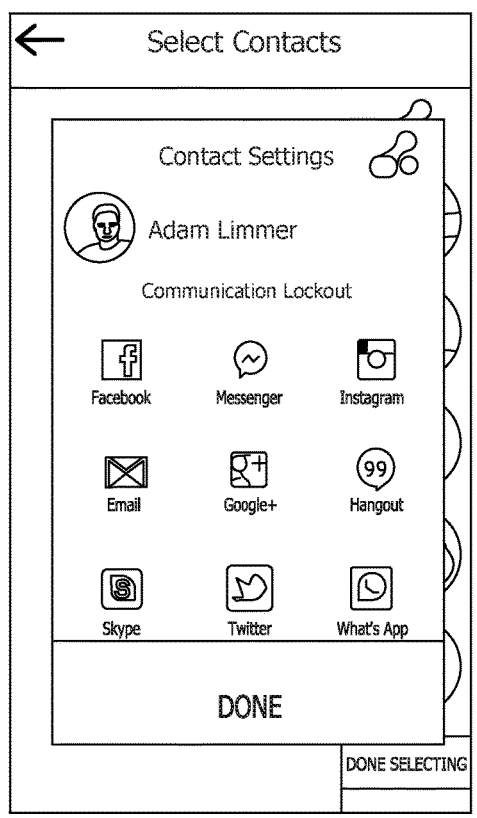

FIG. 3H shows a trivia only screen 495 allowing the user to select the number of questions 500, time lockout selection 505 and communication methods 510 to lock out. The trivia only screen 495 also includes an "I Can't Decide, Pick for Me Drunk Lockout" icon 515 which, when pressed, causes the locking application 215 to randomly select the trivia only parameters. FIG. 3I shows the contact settings 520 derived from the trivia only screen 495.

FIG. 3J shows a games only screen 525 allowing the user to select the time lockout selection 530 and communication methods 535 to lock out. The games only screen 525 also includes an "I Can't Decide, Pick for Me Drunk Lockout" icon 540 which, when pressed, causes the locking application 215 to randomly select the games only parameters. FIG. 3I shows the contact settings 520 of the type derived from the games only screen 525.

FIG. 3K shows a trivia and games screen 545 allowing the user to select the number of questions 550, number of games 555, time lockout selection 560 and communication methods 565 to lockout. The trivia and games screen 545 also includes an "I Can't Decide, Pick for Me Drunk Lockout" icon 570 which, when pressed, causes the locking application 215 to randomly select the trivia and games parameters. FIG. 3I shows the contact settings 520 of the type derived from the trivia and games screen 545.

Figure 3L:
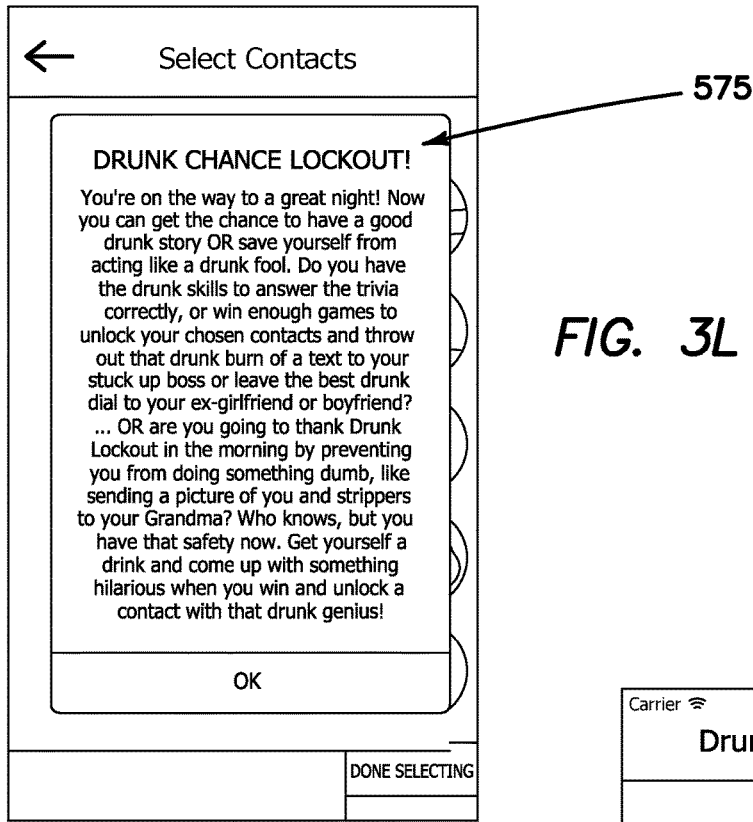
Figure 3M:
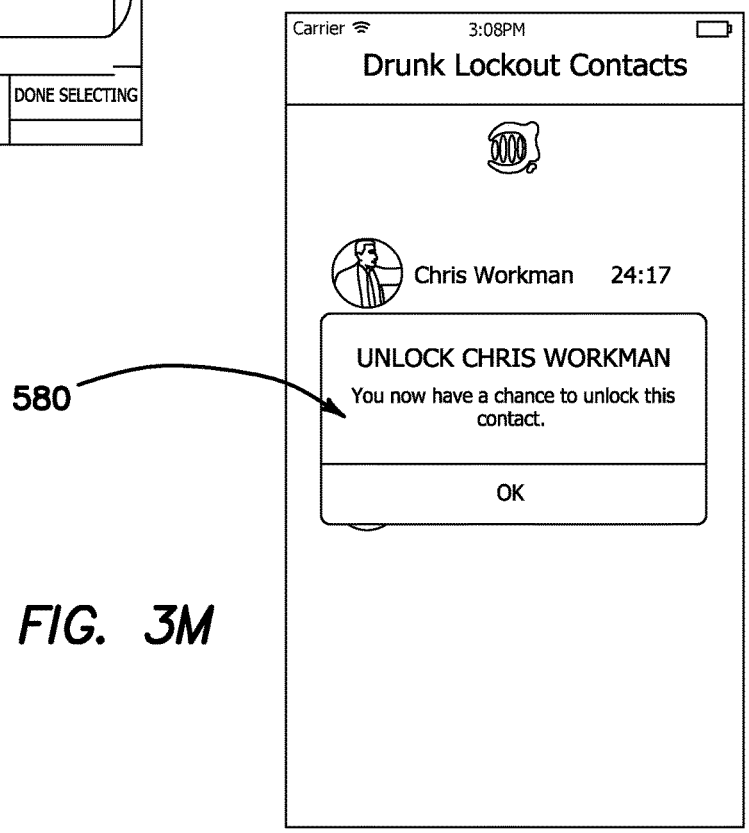

Pressing the "Start Lockout, Begin Drinking!" icon 452 of the type shown in FIG. 3C, stores the selected parameters and locks the contacts. FIG. 3L shows a drunk chance lockout alert 575 which the user must approve to formally begin the locking application 215. Approving the drunk chance lockout alert 575 advances the user to the drunk lockout contacts screen 425 of the type shown in FIG. 3E. FIG. 3M shows a drunk chance opportunity pop-up 580 presented to the user. Should the user fail to respond (i.e., press "ok") within a pre-established time period (e.g., 3 minutes), the challenge is deemed unsuccessful.

Figure 3N:
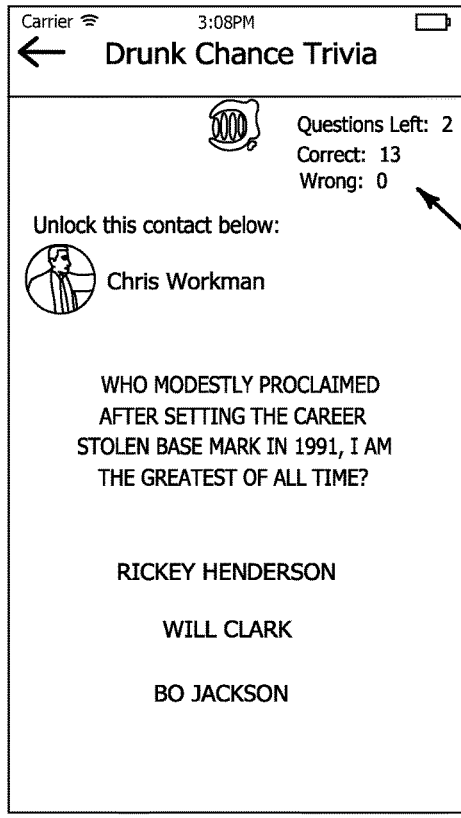
Figure 3O:
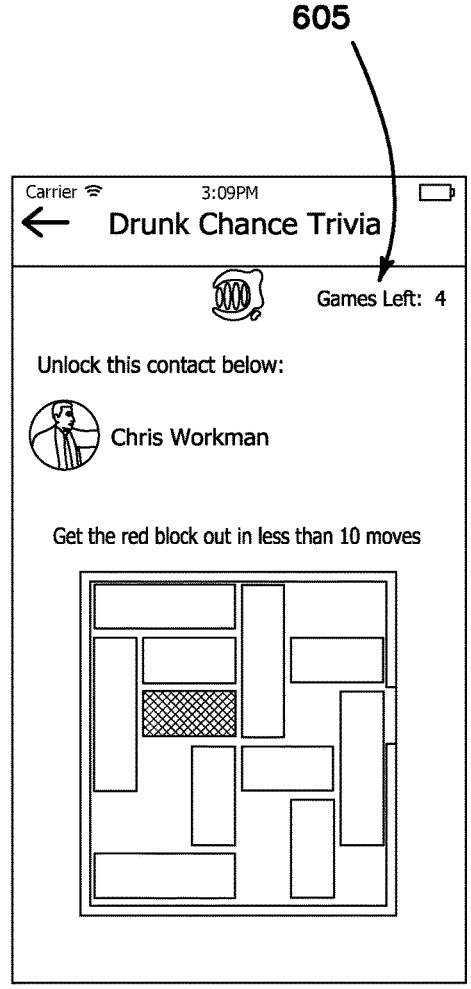

FIG. 3N shows trivia presented on a trivia only screen 590. A legend 595 tracks the results of the trivia questions. FIG. 3O shows a game presented on a games only screen 600. A legend 605 tracks the number of games remaining.

Several other optional features are available for use with the locking application 215. A first feature relates to a GPS tracking module. This GPS tracking module allows a user to add and track the location of friends or other people using the locking application 215. One advantage of the GPS tracking module is to locate friends in very inebriated conditions that may find it difficult to communicate.

Figure 3P:
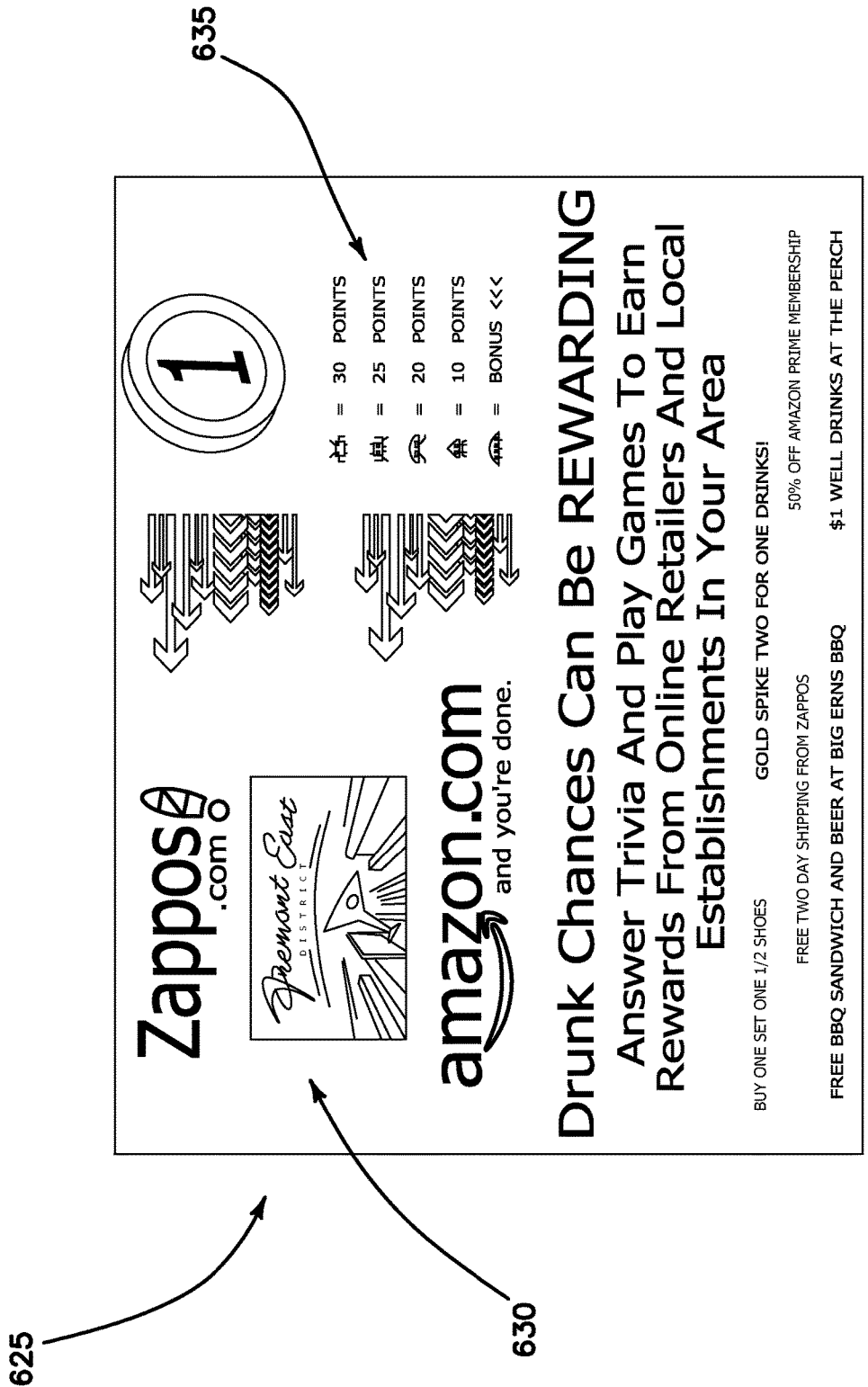

A second optional feature relates to a rewards module whereby electronic tokens, coins and/or points are collected and then redeemed for goods and/or services. FIG. 3P shows a rewards screen 625 detailing retail sponsors 630 and point values 635. In one embodiment, playing games or answering trivia allow the user to generate points. Other interactive challenges may generate points as well. A third optional feature relates to a ride module. The ride module is configured to assist inebriated or sober users to locate local ride services through a taxi service or ride-sharing services like Uber and Lyft. A voice recognition module allows the user to seek a ride using audio commends which may be more accurate and efficient than use of a user interface requiring physical contact (e.g., touch screen).

Figure 3Q:
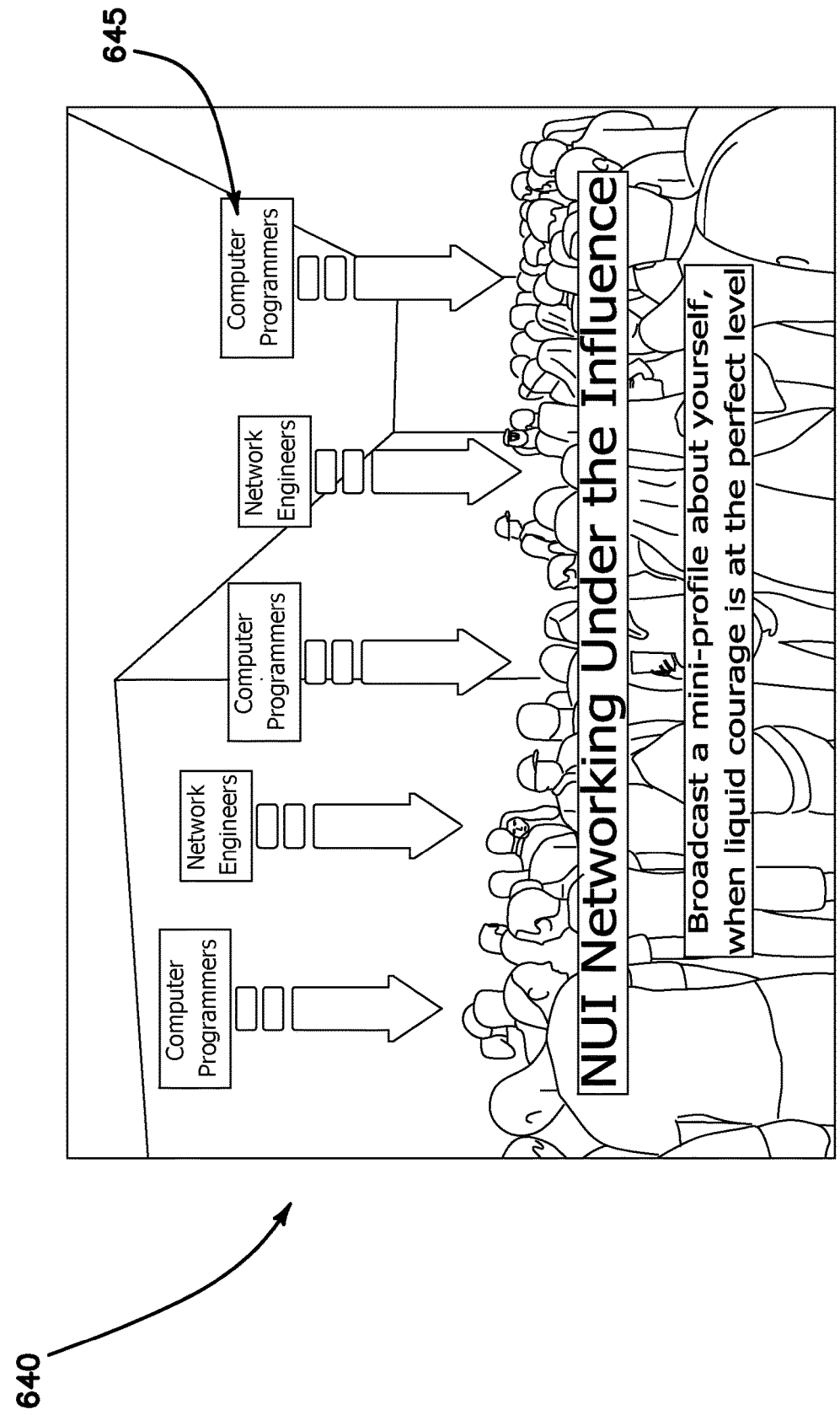

A final optional feature relates to a career networking module with other users of the locking application 215. The career networking module provides the user to take advantage of social settings involving other users in a same social setting (e.g., party or bar). In one embodiment, the career networking module broadcasts a user's location and profile including, for example, name, education, career path and career desire. Other information may be broadcast as well. FIG. 3Q shows a representative career networking screen 640 with general information 645 being broadcast. Inebriated individuals tend to lose inhibitions and may find networking less intimidating.

Figure 4:
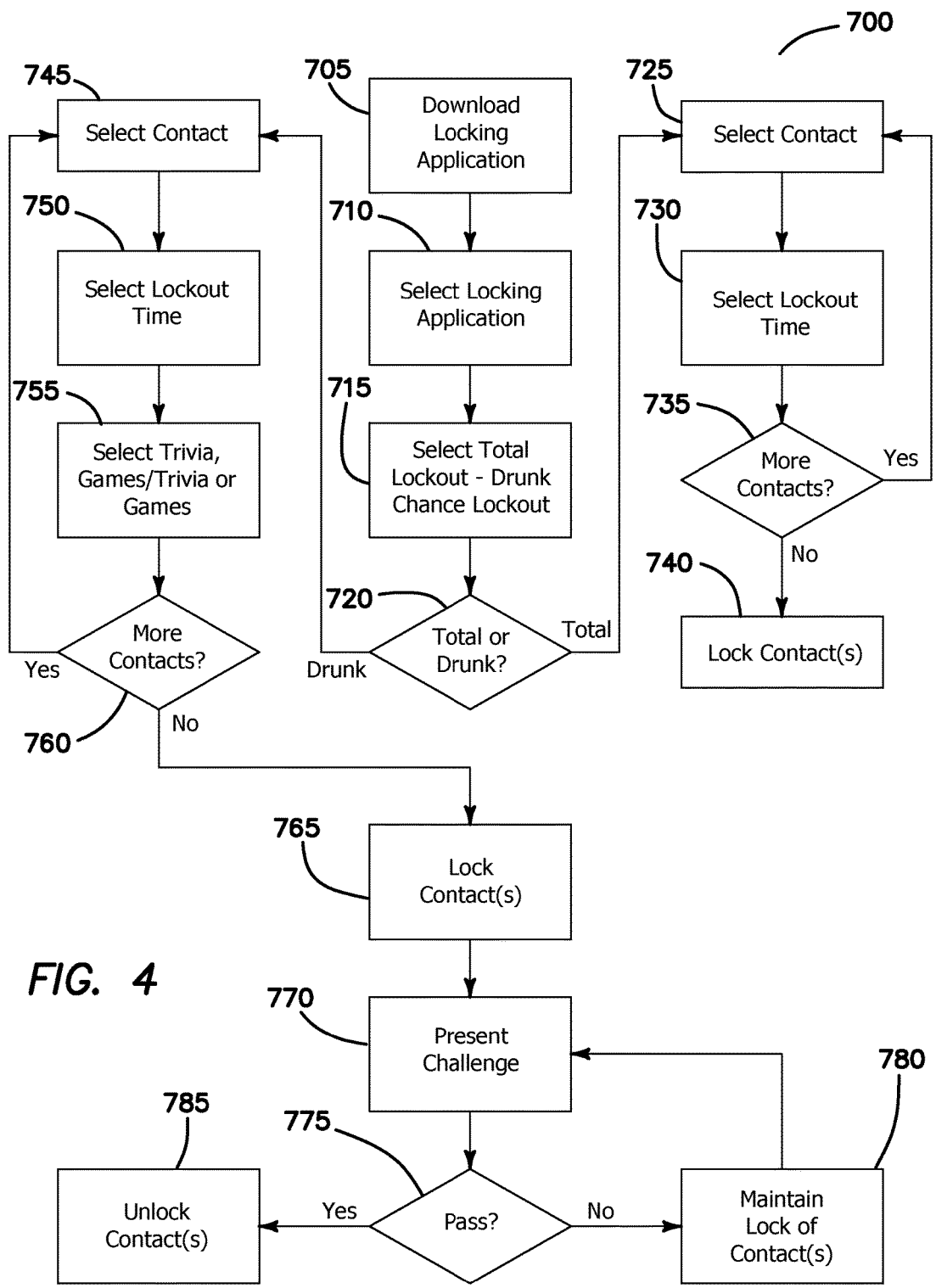
FIG. 4 illustrates a flow chart detailing one methodology according to the embodiments of the present invention.

FIG. 4 shows a flow chart 700 detailing one methodology according to the embodiments of the present invention. At 705, the user downloads the locking application 215. At 710, the user selects the locking application 215 for use. At 715, the user has option to select total lockout or drunk chance lockout and at 720, it is determined whether total lockout or drunk chance lockout has been selected. If total lockout has been selected, at 725, a contact is selected. At 730, the user selects a lockout time. At 735, it is determined if the user wants to select another contact. If so, the chart 700 loops back to 725 for another contact section. If, at 735, there are no more contacts selected, at 740, the one or more contacts are locked. If, at 720, the user selects the drunk chance lockout, at 745, the user selects a contact. At 750, the user selects a lockout time. At 755, the user selects trivia, games and trivia or games. At 760, it is determined if the user wants to select another contact. If so, the chart 700 loops back to 745 for another contact section. If, at 760, there are no more contacts selected, at 765, the one or more contacts are locked. At 770, a challenge is presented to the user. At 775, it is determined if the challenge has been passed or accomplished. If not, at 785, the contact remains locked. If, at 770, the challenge is passed, the contact is unlocked.

Although the invention has been described in detail with reference to several embodiments, additional variations and modifications exist within the scope and spirit of the invention as described and defined in the following claims.

I claim:

1. A system comprising:
   memory for storing a list of contacts, said memory integrated into a smart device; and
   a locking application configured to permit a user to select and lock one or more contacts included within said list of contacts such that said user is unable to communicate, during a user-selected time period, with said selected one or more contacts via said smart device, said locking application further configured to provide a user multiple unique locking options from which to select relative to each contact, said multiple unique locking options comprising at least a total lockout mode whereby selected contacts are unlocked after the expiration of a user-selected total lockout mode time period and a challenge lockout mode whereby selected contacts may be unlocked responsive to a user successfully undertaking a plurality of skill-based challenges prior to the expiration of a user-selected challenge lockout mode time period; and
   wherein said plurality of skill-based challenges are automatically presented to said user at pre-established time intervals during said user-selected challenge lockout mode time period such that said user is provided, multiple, time-spaced, skill-based challenges to unlock said selected contacts prior to the expiration of said user-selected challenge lockout mode time period, said pre-established time intervals are automatically selected according to said user-selected challenge lockout mode time period.

2. The system of claim 1 further comprising a GPS tracking module.

3. The system of claim 1 further comprising a rewards module.

4. The system of claim 1 further comprising a ride module.

5. The system of claim 1 further comprising a networking module configured to broadcast certain user information to other users of said locking application.

6. The system of claim 1 wherein said locking application is further configured to randomly select a pre-established time period during which the one or more selected contacts remain locked.

7. A method comprising:
   providing a locking application for download to memory of a smart device, wherein said locking application is configured to permit a user to select and lock one or more contacts within a list of contacts stored in memory of said smart device such that said user is unable to communicate, during a user-selected time period, with said selected one or more contacts via said smart device, said locking application further configured to provide a user multiple unique locking options from which to select relative to each contact, said multiple unique locking options comprising at least a total lockout mode whereby selected contacts are unlocked after the expiration of a user-selected total lockout mode time period and a challenge lockout mode whereby selected contacts may be unlocked responsive to a user successfully undertaking a plurality of skill-based challenges prior to the expiration of a user-selected challenge lockout mode time period; and presenting to said user skill-based challenges at pre-established time intervals during said user-selected challenge lockout mode time period such that said user is provided, multiple, time-spaced, skill-based challenges to unlock said selected contacts prior to the expiration of said user-selected challenge lockout mode time period, said pre-established time intervals are automatically selected according to said user-selected challenge lockout mode time period.

8. The method of claim 7 further comprising providing said locking application further configured to randomly select a pre-established time period during which the one or more selected contacts remain locked.

9. The method of claim 7 further comprising providing a networking module configured to broadcast certain user information to other users of said locking application.

* * * * *